Nov. 20, 1934.     J. P. CALLAHAN     1,980,976
SIDE WINDSHIELD
Filed July 5, 1932
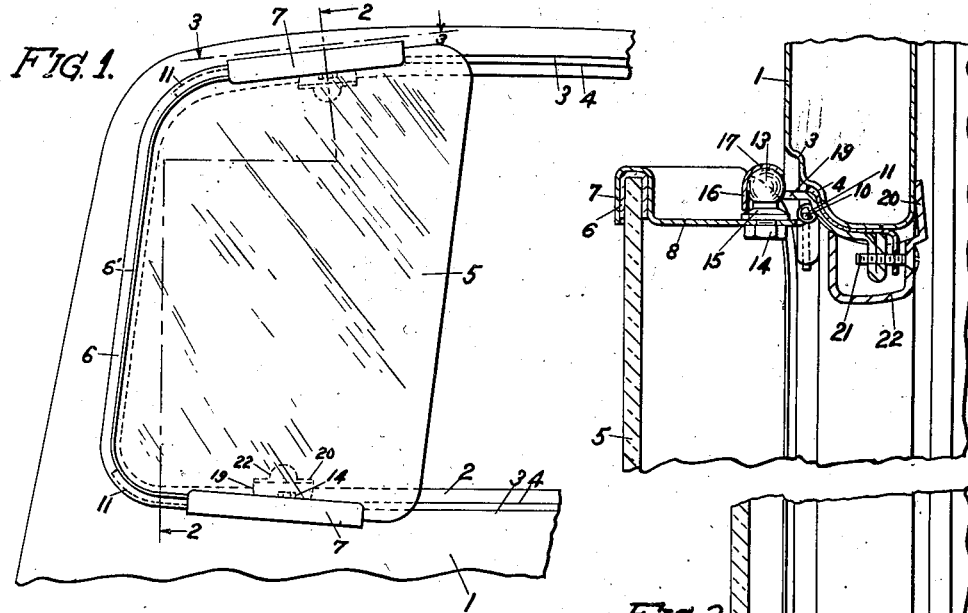
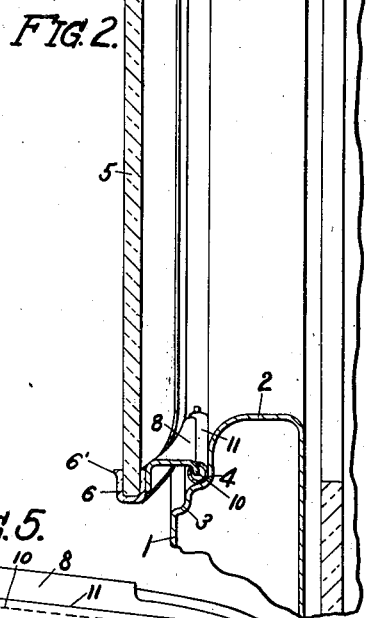
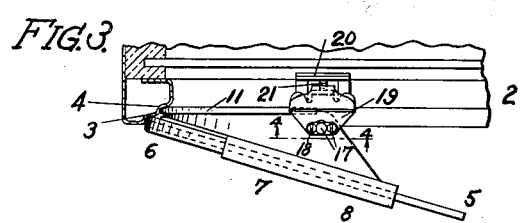
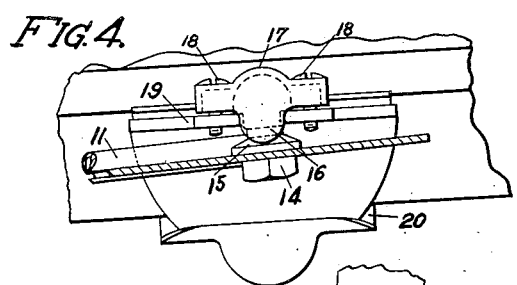
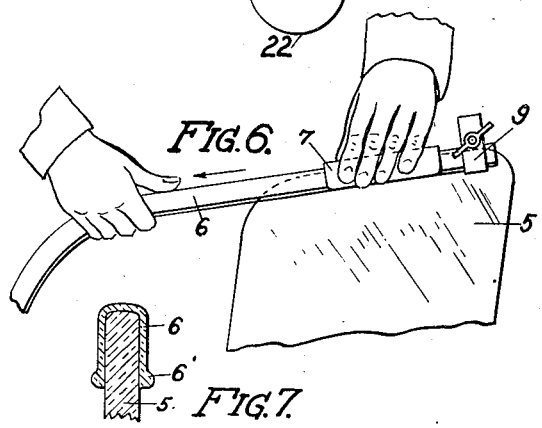
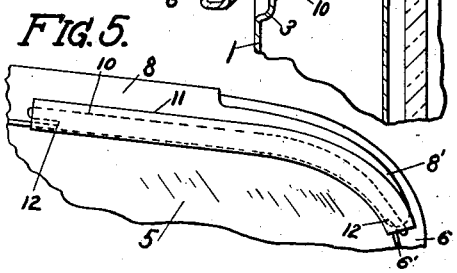
INVENTOR.
JAMES P. CALLAHAN
BY
ATTORNEYS.

Patented Nov. 20, 1934

1,980,976

UNITED STATES PATENT OFFICE 1,980,976

SIDE WINDSHIELD

James P. Callahan, San Francisco, Calif.

Application July 5, 1932, Serial No. 620,743

9 Claims. (Cl. 296—84)

This invention relates to windshields for automobiles, of the form known as "side wings" which consist of small glass shields arranged adjacent the forward vertical edge of window openings to deflect the wind outward from the vehicle.

The objects of the invention are to provide a construction which will be more flexible in aligning itself with the form of modern closed automobile body doors and more effectually seal the joint between the forward edge of the shield.

Other features of advantage will appear in the following description and accompanying drawing.

In the drawing Fig. 1 is a side view of the forward part of a closed body door showing my new side shield in place.

Fig. 2 is an enlarged vertical section of Fig. 1 taken along the line 2—2.

Fig. 3 is a horizontal cross section of Fig. 1 taken along the line 3—3 of Fig. 1, with the upper portion of door frame removed.

Fig. 4 is an enlarged sectional view of a portion of Fig. 3 as seen from the line 4—4 thereof.

Fig. 5 is an enlarged perspective view of the upper front rounding corner of the shield as seen from the car side, showing the mode of attachment of a short length of rubber hose at this point of the construction.

Fig. 6 is a perspective view illustrating the mode of applying a rubber channel strip around the entire forward edge of the shield.

Fig. 7 is a full size cross section of the rubber channel strip.

It is to be understood in the following description that the lower end of the side wing shown in Fig. 2 is provided with clamping members and a ball and socket connection identical in construction to the one shown in detail in Fig. 2 at the top of the side wing, and positioned as indicated in Fig. 1.

In further detail, 1 is the car door, 2 the window molding which, as shown in Figs. 2 and 3, has two slightly concave or inside corners 3, 4 running around it. It should be noted from Fig. 1 that the window opening formed by this molding is not square, the top is arched, the forward line is not vertical, and it has large rounding corners, all of which makes it difficult to attach a side shield to the door and also difficult to seal the leading edge of the shield against the door.

The shield itself consists of a sheet of plate glass 5 of the desired width, of a height to extend to the outer mold step 3 and is rounded at its corners, the forward ones being shaped to fall into the mold step 3 and the forward edge also.

Tightly stretched around both forward rounded corners and front edge of the glass is a split length of a good resilient grade of rubber channel 6 which bears into the outer mold step 3 and is held in place on the glass at top and bottom edges by the outer channel or U-shaped edges 7 of upper and lower supporting brackets 8 and which rubber is molded with a strengthening bead 6' around its inner edges (as shown in Fig. 7) and is normally of a size to fit tightly upon the glass and very tightly within the channel edges of the brackets when over the glass. In fact so tightly that the brackets could not be practically forced in place without the artifice of first clamping the strip to the glass at one end by a screw clamp 9 (Fig. 6), then stretching the rubber with considerable force in direction of the arrow and thereby contracting somewhat the thickness of the rubber so that the channel edge 7 of the bracket may be forced down over it. The rubber is then stretched around the front and edge of the glass, clamped at the far end, the other bracket forced over, the clamps released and the projecting ends cut off. By this means the rubber swells somewhat under the channel edges when the clamps are removed and the brackets are held so firmly in place by friction alone that they never loosen, even without the use of adhesive of any kind.

The plate 8 of the bracket lies generally in a horizontal plane and is triangular as shown in Fig. 3 to fit within the angle formed between the side of the car and the shield plate 5. It is also curved toward the point to follow around the corner for a distance as best shown in Figs. 2 and 3, and as shown in Fig. 5 is formed with an outwardly turned lip 10 which is covered with a small soft rubber hose 11 slit along one side to about a quarter of an inch of the opposite ends respectively. This lip 10 is undercut or slotted back at each end for about a quarter of an inch as at 12 (Fig. 5) and the hose is sprung over the lip under longitudinal tension with the lip entering the slotted side of the hose and the uncut ends of the hose hooked into the slots 12. The lip 10 is so arranged that the small hose 11 lies in the inner step 4 of the window mold as shown in Fig. 2 and follows around the corner and dies off adjacent the large rubber strip 6 which continues the contact at the front of the shield clear around in step 3 of the mold. Of course where the molding has but one step, or none at all, the position of lip 10 is made to suit or so that the small rubber hose and the large rubber strip will seat against a common plane.

To provide the pivotal or self-aligning mounting for the upper and lower ends of the sidewing shield plates 8 are provided at both the upper and lower ends of the side-wing as indicated in Fig. 2, and each of the plates is provided with ball-ended post 13 projecting outwardly therefrom and secured thereto by a threaded nut 14. This post has a round flaring base portion 15 against which rides a heel portion 16 of a sheet metal socket device 17 which is secured by screws 18 to a clamp member 19 which cooperates with clamp member 20 drawn together by screw 21, covered by a housing 22, for clamping the edge of the window opening but which clamp device, apart from the present ball disclosure, is already shown and claimed in my copending patent application filed under Serial No. 560,257. The particular feature of importance in the present construction is that the rounding heel portion 16 in riding on the flaring base 15 of the post permits free swinging of the shield on a substantially vertical axis running through both balls, but prevents a canting action of the clamps 19, 20 which tends to force them to swing inwardly and off of the rounding edge of the window opening. This is best understood by a reference to Fig. 2, and an important improvement which the earlier construction did not provide for.

Having thus described my improved side wing or shield construction what I claim is:

1. A side windshield for an automobile comprising a plate of glass adapted to be vertically positoned adjacent the side of the automobile, a pair of supporting brackets, one at the upper and one at the lower edge of the plate, said brackets formed with a U-shaped portion embracing the edge of the plate, and a one-piece U-shaped soft rubber strip tightly gripped at its opposite ends between the U-shaped portions of the brackets respectively and the plate, said rubber strip continuing around the forward edge of the glass sheet from bracket to bracket and under the same.

2. A side windshield for an automobile comprising a plate of glass with well rounded corners adapted to be vertically positioned adjacent the side of the automobile, a pair of supporting brackets, one at the upper and one at the lower edge of the plate, said brackets formed with a U-shaped portion embracing the edge of the plate, and a one-piece U-shaped soft rubber strip tightly gripped at its opposite ends between the U-shaped portions of the brackets respectively and the plate, said rubber strip continuing around the forward edge of the glass sheet from bracket to bracket and under the same, said brackets each formed with an inner flange extending at an angle to the glass plate diverging from the front edge thereof and curved to follow the rounded front corner of the plate.

3. A side windshield for an automobile having a pair of steps around the edge of its window, comprising a glass plate, a pair of brackets for supporting the plate to the automobile, a soft edging embracing the forward edge of the plate arranged to lie in one of the mold steps, the brackets formed with inner edges and provided with soft edging arranged to lie in the other step to substantially merge into the first mentioned soft edging.

4. In a side windshield for an automobile, a glass sheet adapted to be arranged vertically adjacent the side of the automobile, a pair of supporting brackets at top and bottom of the sheet, said brackets formed to close the forward portion of the space between the glass sheet and the car, a lip on the inner edge of said brackets provided with undercut ends, and a strip of soft material hooked over the said lip.

5. In a side windshield for an automobile, a glass sheet adapted to be arranged vertically adjacent the side of the automobile, a pair of supporting brackets at top and bottom of the sheet, said brackets formed to closed the forward portion of the space between the glass sheet and the car, a lip on the inner edge of said brackets provided with undercut ends, and a short length of soft rubber hose tensioned and hooked over opposite ends of said lip.

6. In a side windshield for an automobile, a glass sheet adapted to be arranged vertically adjacent the side of the automobile, a pair of supporting brackets at top and bottom of the sheet, said brackets formed to close the forward portion of the space between the glass sheet and the car, a post with a ball end vertically projecting from each bracket and provided with a flaring base, a socket member overlying and embracing each ball and provided with a heel portion riding against said flaring base, and clamp members securing the socket members to the automobile.

7. The process of securing a bracket with a U-shaped clamping edge to a glass windshield which comprises first forcibly stretching a soft rubber strip of U-shaped cross section in embracing relation to the edge of the glass plate, and then forcing the U-shaped clamping edge of the bracket over the glass and stretched rubber.

8. The process of securing a bracket with a U-shaped clamping edge to a glass windshield which comprises first forcibly stretching a soft rubber strip of U-shaped cross section in embracing relation to the edge of the glass plate, and then forcing the U-shaped clamping edge of the bracket over the glass and stretched rubber thereafter relaxing the rubber and cutting off any undesirable rubber projecting beyond the ends of the clamping edge of the brackets.

9. In a side windshield for an automobile, a generally vertically disposed glass sheet, a pair of supporting brackets secured to said sheet at the upper and lower edges thereof, a pair of horizontally extending attaching members arranged and adapted for securing to the side of an automobile, a ball and socket joint connecting the brackets and the attaching members respectively arranged and adapted to permit universal pivoting of each attaching member at the joint, and means associated with said ball and socket joint limiting vertical movement of the attaching member about a horizontal axis at the joint in one direction only when the attaching member is in a horizontally extending position while permitting pivotal movement of the attaching member in all other directions.

JAMES P. CALLAHAN.